United States Patent [19]

Hopkins et al.

[11] Patent Number: 4,722,381

[45] Date of Patent: Feb. 2, 1988

[54] BELT STRUCTURE HAVING ALTERNATING S AND Z TWIST CORDS

[75] Inventors: William M. Hopkins, Hudson; James E. Koerner, Uniontown, both of Ohio

[73] Assignee: The Goodyear Tire & Rubber Company, Akron, Ohio

[21] Appl. No.: 777,644

[22] Filed: Sep. 19, 1985

[51] Int. Cl.$^4$ .................................................. B60C 9/26
[52] U.S. Cl. ..................................... 152/527; 152/528
[58] Field of Search ............... 152/527, 528, 529, 451, 152/556, 538; 57/902; 428/295

[56] References Cited

U.S. PATENT DOCUMENTS

| | | | |
|---|---|---|---|
| 1,689,119 | 10/1928 | Evans | 57/902 X |
| 3,243,338 | 3/1966 | Jackson | 152/535 X |
| 3,357,470 | 12/1967 | Massoubre | 152/361 |
| 3,404,721 | 10/1968 | Massoubre | 152/361 |
| 3,509,710 | 5/1970 | Redmond | 152/527 X |
| 3,515,197 | 6/1970 | Boileau | 152/361 |
| 3,575,228 | 4/1971 | Marzocchi | 152/527 |
| 3,945,421 | 3/1976 | Pogue et al. | 152/528 |
| 3,949,797 | 4/1976 | Mirtain et al. | 152/528 X |
| 3,949,799 | 4/1976 | Montagne | 152/527 |
| 3,973,613 | 8/1976 | Marzocchi et al. | 152/528 |
| 4,155,394 | 5/1979 | Shepherd et al. | 152/527 |
| 4,184,529 | 1/1980 | Boileau | 152/528 |
| 4,197,894 | 4/1980 | Boileau | 152/528 |
| 4,234,031 | 11/1980 | Pommier | 152/538 X |
| 4,273,177 | 6/1981 | Nybakken | 152/528 |
| 4,436,131 | 3/1984 | Yamaguchi et al. | 152/528 |

Primary Examiner—Donald E. Czaja
Assistant Examiner—Ramon R. Hoch
Attorney, Agent, or Firm—Charles Smith

[57] ABSTRACT

A belt structure of a pneumatic tire with plies (13, 15) consisting of alternating S and Z twist cords and the edges of at least one ply folded.

4 Claims, 14 Drawing Figures

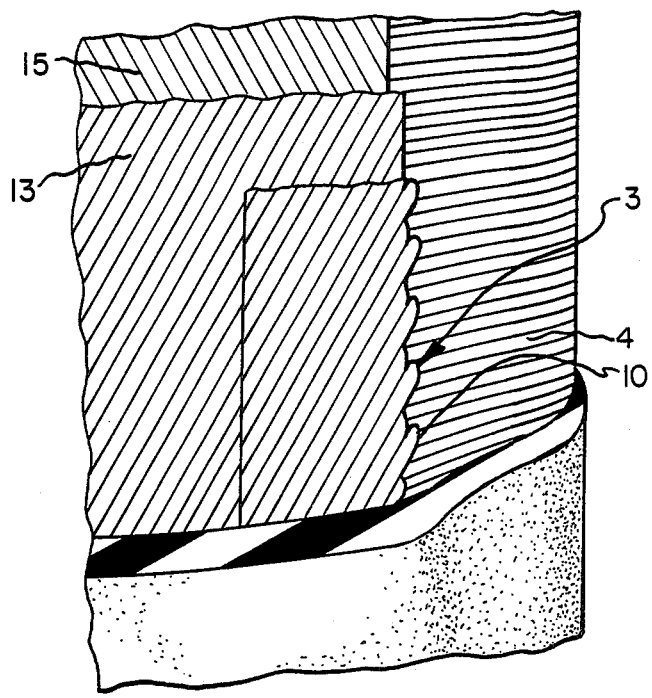
FIG.4
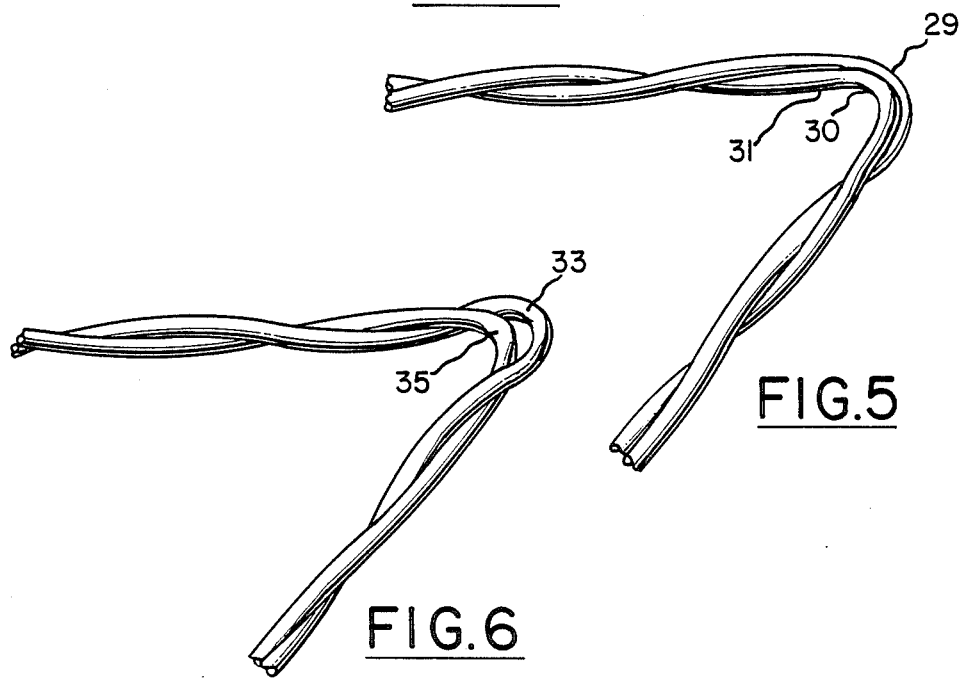
FIG.5
FIG.6

BELT STRUCTURE HAVING ALTERNATING S AND Z TWIST CORDS

BACKGROUND OF THE INVENTION

This invention relates to an improvement in the belt structure for a pneumatic tire, in particularly for high-speed tires.

Typically, the belt of a tire is subjected to many different conditions while being used on a motor vehicle. The tire goes through turns, curves, adverse road conditions and is expected to respond to these many conditions. The belt structure during such condition is required to be flexible and resilient with the tire as well as maintain structural rigidity when the tire is being driven upon. The belt structure is most severely stressed when the tire travels around turns and curves. During this time the cords in the belt are placed in tension. The edge of the belt after frequent exposure to stress/strain cycles could potentially lose some of its structural integrity.

An improvement in the belt structure would be to reduce the stress and strain levels that the belt structure is subjected to during normal driving conditions.

A typical belt structure is made of one or more plies of material arranged in the radial planes of the tire. Ply material used in the belt has been either fabric (i.e. fiberglass, aramid) or metallic (i.e. steel) or composite material (fiberglass-aramid, aramid-nylon, etc.). Several strands of this material typically is bundled together to form twisted cords. The cords are then imbedded in a elastomeric type substance before being used in the belt structure. The elastomeric substance used for this process is usually rubber or one of its by-product. During belt manufacturing these coated twist cords are disposed circumferentially around the carcass of the tire. The belt structure then is imbedded into the carcass and becomes a part thereof.

The belt structure that seems to function better for the present invention comprises cords that vary from 6 ends/inch to 35 ends/inch depending on cord gauge being used. The bias angle for the belt structure cords positioned centrally on the belt ply varies from 15 degrees to 40 degrees.

The present invention in the belt structure minimizes stress loading that the belt structure normally encounters by folding the belt on at least one of its edges. This reduction in stress occurs because the twist cords when folded loosens; and thus relieves stress that exists as a result of the twists in the cords.

SUMMARY OF THE INVENTION

The basic concept of the invention, which is particularly unique in high performance tires, consists of alternating S and Z twist cords in a belt structure with at least one edge of the belt folded. The twist cord material could be either metal, fiberglass, metal, rayon, nylon or composite of those materials. Alternating the directions of twist of adjacent cords offer a number of advantages. When the belt is folded either radially inwardly or outwardly a very peculiar phenomenon occurs to the alternating S and Z twist cords. While one of the cords partially untwist, the next adjacent twist cord actually tighten. The cord that has become loosened has the effect of releasing the compressive stresses that existed when the cord was twisted. The belt structure in effect becomes stress relieved. Folding the belt has occasionally resulted in the breakage of some of the cords. This breakage has been shown to have little or no impact on the effectiveness of the folded belt structure according to this invention. The use of fabric, aramid or composite twist cords in the belt structure in the manner proposed reduces the dynamic stresses for the tire. Thus, a reduced dynamic stresses will result in a more stable tire.

BRIEF DESCRIPTION OF THE DRAWING

FIG. 4 is a top view of a cross section with the folded belt, the carcass and several plies being shown.

FIG. 5 shows a side view of a cord with a Z twist which has been partially folded.

FIG. 6 shows a side view of a cord with a S twist which has been partially folded.

PREFERRED EMBODIMENT

In all of the figures, the diameter and distance apart from cords have been exaggerated for clarity.

Figure 1:
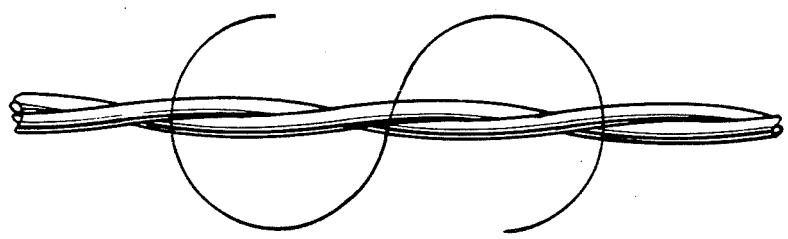
FIG. 1 is a side view of a twist cord with a S twist.

In the drawing, FIG. 1 shows the side view of cord with a S twist. The cords consist of filaments of material that could be either fiberglass or aramid.

Figure 2:
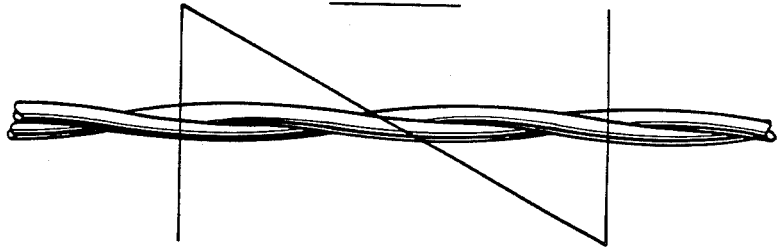
FIG. 2 is a side view of a twist cord with a Z twist.

FIG. 2 shows a side view of a twist cord with a Z twist.

Figure 3:
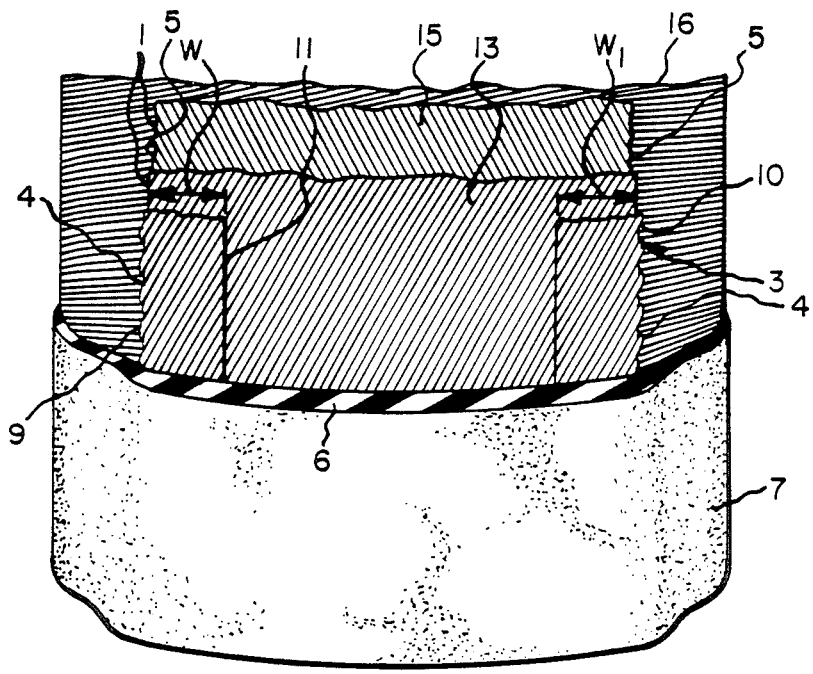
FIG. 3 is cross-section of a tire carcass which shows the belt with its edge folded.

A view looking towards a tire with part of the tread to show the strutural component of the tire is shown in FIG. 3, the belt structure is shown with two plies 13, 15 lying adjacent to the carcass 6. The edge of the ply 15 is shown folded radially upward so that its edge portion is parallel to the ply 13 and is folded so that it lies on top of the ply 13. At the folded edge of the ply 15 a cord 4 is shown to be tightened 12 as a result of the fold. Also shown at the folded edge is that another cord 10 has loosens as a result of the fold. The loosened cords result in a reduction of the compressive stress level in the ply, the loosening of the cord 10 in effect stress relieves the ply. At the edge of the ply the loosened cords are shown to alternate along the ply 15 edge, this result from having alternating S and Z twist cords. The tightened twist cord 4 is also shown alternating.

The edge 5 of ply 15 lies between ¼–3 inches from the folded edge 3.

The belt structure 1 is centered laterally on the carcass 6 of the tire so that its folded edge portion 2, 3 are equal distance from the edge of the carcass 6.

The plies 13 and 15 have alternating S and Z twist cords.

The width W and W1 are the same. Width W1 is measured from the folded edge portion 3 to edge 5 of the ply it varies from ¼ to 3 inches.

FIG. 4 is an enlargement of FIG. 3 showing two plies 15, 13 with the edge of one ply 15 folded so that it overlaps the other ply 13. At the edge 3 where the fold begins the cord 10 as shown extends laterally outward from the folded edge portion and all cords alternating from the cord 10 extend outward as well. This laterally outward extension of the cord 10 shows that the cord 10 is loosening and is untwisting at the juncture of the fold. The twist in the cord results in an accumulation of compressive stresses in the cord, when the cord becomes untwisted the stress in the cord is released. The other cords 4 at the folded edge are tightened at the folded edge. These cords 4 tend to recede into the folded edge.

FIG. 5 shows a side view of a Z twist cord. The cord is shown folded, the filament 31 moves closer to other adjacent filament 29, the twist cord tightens at the folded juncture 30.

FIG. 6 shows a side view of a S twist cord where the filament 33 had become unwound as result of the fold. This unwinding of the twist cord releases stresses in the cord.

Figure 7:
FIG. 7 shows a frontal view of belt with a ply that has its edges folded radially inwardly so that one ply edges overlap the other ply.

FIG. 7 shows two plies of material of the belt with one ply 37 edge portion folded so that its edge portion extend radially inward over the other ply 39.

Figure 8:
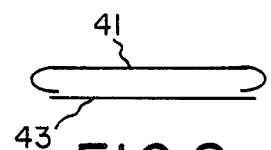
FIG. 8 shows a frontal view of a belt where one ply is folded so that it folds against itself and is sandwiched between the other ply.

FIG. 8 shows two plies with one ply 41 edge portion folded so the folds extend radially inward and are nested against itself with the folded portion not enclosing the other ply 43.

Figure 9:
FIG. 9 shows a frontal view of a belt that has the outer ply edges folded radially outwardly so that it folds onto itself.

FIG. 9 shows a belt comprising two plies with one ply 45 edge portion folded radially outward so that the edge portion folds against itself with the folded portion not enclosing the other ply 47.

Figure 10:
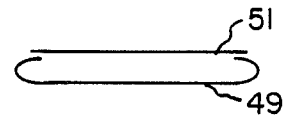
FIG. 10 shows a frontal view of a belt, the inner ply edges are folded radially outwardly and onto itself, the edges become sandwiched between the two plies.

FIG. 10 shows a belt with two plies with one ply 49 having its edge portion folded so that its edge portions are being sandwiched between the other ply 51.

Figure 11:
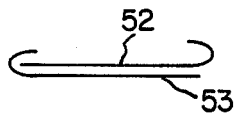
FIG. 11 shows a frontal view of a belt with the inner belt and outer belt edge portion folded radially outwardly.

FIG. 11 shows a belt comprising with one inner ply 53 folded radially outward so that its edge portion folds over the outer ply 52 and shows that outer ply 52 has its edge portion folded radially outward so that its edge portion only the outer ply.

Figure 12:
FIG. 12 shows a frontal view of three plies with the middle belt edge portion folded radially outwardly.

FIG. 12 shows a belt comprising three plies with the ply 55 between the inner 56 and outer 54 ply with both edge portion folded radially outward with the folds of the ply overlapping the outer ply 54.

Figure 13:
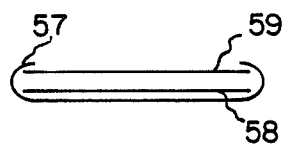
FIG. 13 shows a frontal view of a belt with three plies with innermost belt edge portions folded radially outwardly.

FIG. 13 shows a belt comprising three plies with the inner belt 57 having edge portion folded radially outwardly so that the edges of the inner ply 57 overlaps outer ply 59 and the ply 58, inner ply 58 is positioned between the inner ply 57 and the outer ply 59.

Figure 14:
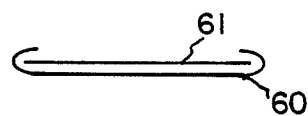
FIG. 14 shows a frontal view belt with two plies with edge portion of the edge belt folded radially outwardly.

FIG. 14 shows a belt comprising two plies with the edge portions of the inner belt 60 folded radially upward so that both edge portions overlaps the outer ply 61.

While certain representative embodiments and details have been shown for the purpose of illustrating this art that various changes and modifications may be made therein without departing from the spirit or scope of the invention.

We claim:

1. A tire comprising a belt structure extending circumferentially about the axis of rotation of the tire and disposed radially inward of a ground engaging tread, wherein the belt structure comprises at least one belt ply with the belt ply having at least one folded edge portion, the belt ply consists of adjacent "S" and "Z" twist cords that alternate in a side by side manner.

2. A tire according to claim 1 wherein each ply has alternating "S" and "Z" twist cords in a stress-relieved condition.

3. A tire as in claim 1 wherein the tire is a radial pneumatic tire.

4. A tire as in claim 2 wherein the tire is a radial pneumatic tire.

* * * * *